(12) United States Patent
Yako et al.

(10) Patent No.: US 10,061,315 B2
(45) Date of Patent: Aug. 28, 2018

(54) ADVANCED AUTONOMOUS VEHICLE TUTORIAL

(71) Applicant: Ford Global Technologies, LLC, Dearborn, MI (US)

(72) Inventors: Sarra Awad Yako, Allen Park, MI (US); Levasseur Tellis, Southfield, MI (US); Christopher Semanson, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 43 days.

(21) Appl. No.: 15/257,989

(22) Filed: Sep. 7, 2016

(65) Prior Publication Data
US 2018/0067486 A1   Mar. 8, 2018

(51) Int. Cl.
| | |
|---|---|
| *G05D 1/08* | (2006.01) |
| *G05D 1/00* | (2006.01) |
| *B60W 50/08* | (2012.01) |
| *G05B 19/042* | (2006.01) |
| *B60W 50/00* | (2006.01) |

(52) U.S. Cl.
CPC .......... *G05D 1/0088* (2013.01); *B60W 50/08* (2013.01); *G05B 19/042* (2013.01); *B60W 2050/0074* (2013.01); *G05B 2219/2637* (2013.01)

(58) Field of Classification Search
CPC combination set(s) only.
See application file for complete search history.

(56) References Cited

U.S. PATENT DOCUMENTS

| | | | |
|---|---|---|---|
| 6,161,071 A | 12/2000 | Shuman et al. | |
| 9,174,642 B2 | 11/2015 | Wimmer et al. | |
| 2010/0036562 A1 | 2/2010 | Becker | |
| 2010/0222976 A1 | 9/2010 | Haug | |
| 2010/0332080 A1 | 12/2010 | Bae | |
| 2012/0135382 A1 | 5/2012 | Winston et al. | |
| 2015/0203126 A1 | 7/2015 | Kobana et al. | |
| 2016/0042664 A1 | 2/2016 | Haberl | |
| 2017/0110022 A1* | 4/2017 | Gulash | G09B 9/052 |
| 2017/0349186 A1* | 12/2017 | Miller | G05D 1/0088 |

FOREIGN PATENT DOCUMENTS

WO   WO 2016068273 A1   5/2016

OTHER PUBLICATIONS

"Human Factors Evaluation of Level 2 and Level 3 Automated Driving Concepts," U.S. Dept. of Transportation, National Highway Traffic Safety Administration, DOT HS 812 043, Jul. 2014.
Search Report dated Dec. 19, 2017 from United Kingdom Intellectual Property Office regarding GB Application No. 1713807.4 (3 pages).

* cited by examiner

*Primary Examiner* — Anne Marie Antonucci
*Assistant Examiner* — Renee LaRose
(74) *Attorney, Agent, or Firm* — Frank A. MacKenzie; Bejin Bieneman PLC

(57) ABSTRACT

A vehicle system includes a user interface, an autonomous mode controller, and a processor. The autonomous mode controller controls a host vehicle in a partially autonomous mode. The processor receives a first user input requesting the partially autonomous mode and command the user interface to present a tutorial associated with the partially autonomous mode. The processor receives a second user input indicating that a driver completed the tutorial and activates the partially autonomous mode in response to receiving the second user input.

18 Claims, 2 Drawing Sheets

ADVANCED AUTONOMOUS VEHICLE TUTORIAL

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

Some drivers may not fully appreciate the limits of autonomous vehicle operation. For example, the driver of a vehicle that can autonomously park itself may not realize that he or she has to manually find a parking spot and manually align the vehicle relative to the parking spot before activating the park assist feature. Therefore, drivers who are not familiar with the different levels of autonomous operation or the limitations of particular autonomous features may, on the one hand, rely too heavily on the vehicle to perform certain actions automatically. In other words, the driver may not provide a driver input needed by the vehicle for the partially autonomous operation. On the other hand, some drivers may not rely enough on the vehicle to perform certain operations, resulting in the driver providing unnecessary driver inputs to the steering wheel, brake pedal, or accelerator pedal, which may interfere with the vehicle's ability to perform certain autonomous operations.

One way to address such issues is with an autonomous operation system that requires the driver to watch and interact with a tutorial associated with the particular mode of autonomous operation that the driver wishes to activate. The autonomous operation system includes a user interface, an autonomous mode controller, and a processor. The autonomous mode controller controls a host vehicle in a partially autonomous mode. The processor receives a first user input requesting the partially autonomous mode and command the user interface to present a tutorial associated with the partially autonomous mode. The processor receives a second user input indicating that a driver completed the tutorial and activates the partially autonomous mode in response to receiving the second user input. By requiring the driver to watch and interact with the tutorial, the driver may be reminded of certain limitations of the particular partially autonomous mode.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
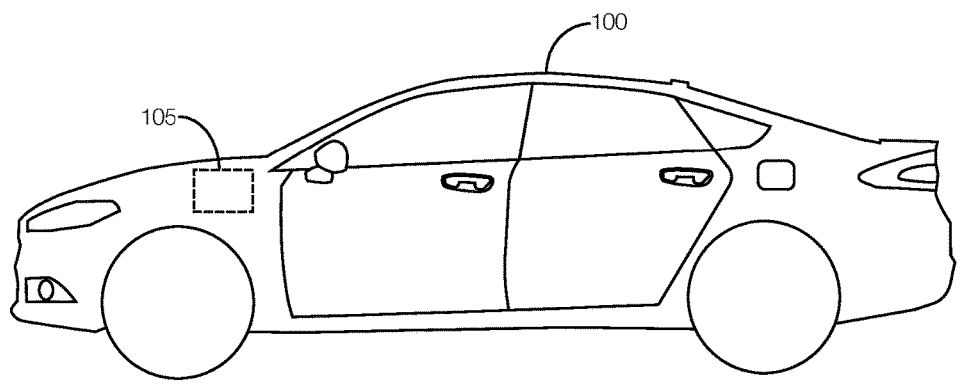
FIG. 1 illustrates an example vehicle with an autonomous operation system for activating certain partially autonomous modes of operation for a particular driver.

As illustrated in FIG. 1, the host vehicle 100 includes an autonomous operation system 105 for activating certain partially autonomous modes of operation after the driver completes an interactive tutorial associated with the partially autonomous mode of operation. For example, the autonomous operation system 105 may present the tutorial in response to a user input (referred to below as a "first user input") requesting that the host vehicle 100 operate in the partially autonomous mode. The tutorial may include text, video, or both, and may require various driver interaction. For example, the tutorial may require that the driver provide various user inputs (referred to below as a "second user input") for the tutorial to proceed or end. Examples of the second user input may include an acknowledgement from the driver that he or she understands the limitations of the host vehicle 100 operating in the partially autonomous mode. The autonomous operation system 105 may prompt the driver to provide such user inputs, and the prompts may be in the form of questions or virtual buttons presented to the driver. The autonomous operation system 105 may activate the partially autonomous mode in response to receiving the second user input. If the driver fails to complete the tutorial or does not provide the necessary user input, the autonomous operation system 105 may prevent the host vehicle 100 from operating in the partially autonomous mode. Moreover, the partially autonomous mode may be temporarily disabled while the tutorial is presented and before the second user input is received.

Although illustrated as a sedan, the host vehicle 100 may include any passenger or commercial automobile such as a car, a truck, a sport utility vehicle, a crossover vehicle, a van, a minivan, a taxi, a bus, etc. As discussed in greater detail below, the host vehicle 100 is an autonomous vehicle that can operate in an autonomous (e.g., driverless) mode, a partially autonomous mode, and/or a non-autonomous mode. The partially autonomous mode may refer to the SAE Level 2 mode of operation where the host vehicle 100 can control steering, acceleration, and braking under certain circumstances without human interaction. The partially autonomous mode may further refer to the SAE Level 3 mode of operation where the host vehicle 100 can handle steering, acceleration, and braking under certain circumstances, as well as monitoring of the driving environment, even though some human interaction is sometimes needed.

Figure 2:
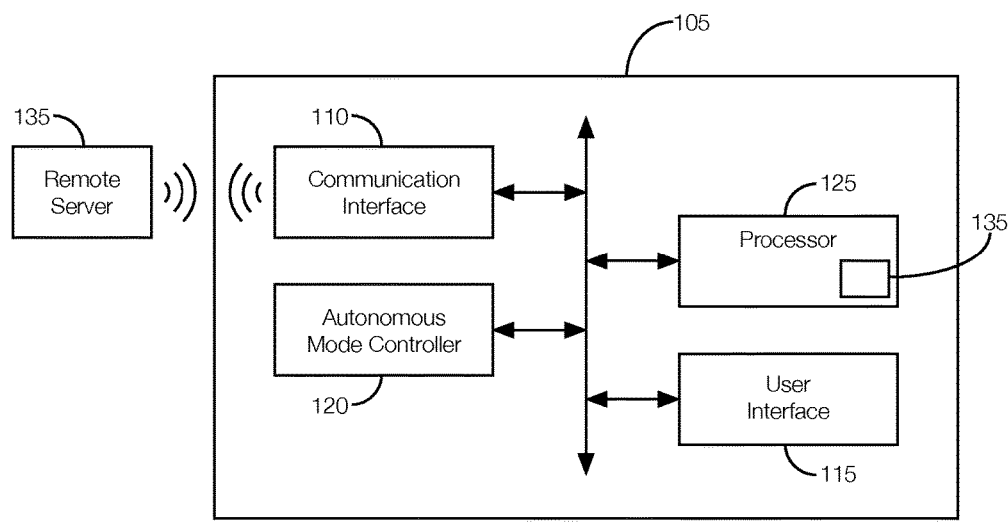
FIG. 2 illustrates example components of the vehicle, including example components of the autonomous operation system.

Referring now to FIG. 2, the autonomous operation system 105 may include or work in conjunction with a communication interface 110, a user interface 115, an autonomous mode controller 120, and a processor 125.

The communication interface 110 is implemented via circuits, chips, or other electronic components that can facilitate wireless communication. The communication interface 110 may be programmed to generate and transmit messages according to any number of wireless communication protocols. For example, the communication interface 110 may be programmed to communicate in accordance with one or more of the Bluetooth®, Bluetooth® Low Energy, Wifi, Dedicated Short Range Communication (DSRC) protocols. In some instances, the communication interface 110 may be programmed to communicate over a cellular or satellite network. For example, in response to a command received from the processor 125, the communication interface 110 may be programmed to wirelessly communicate with a remote server 130 storing a database associating drivers to various skill levels. That is, the database may indicate whether the driver is experienced enough to operate the host vehicle 100 in a partially autonomous mode without completing the tutorial. The communication interface 110 may be programmed to receive messages from the remote server 130 and forward those messages to the processor 125.

The user interface 115 is implemented via circuits, chips, or other electronic components that can present information to and receive user inputs from one or more occupants of the host vehicle 100. The user interface 115 may include a display screen, including a touch-sensitive display screen, real or virtual buttons, a microphone, speakers, etc. In some possible approaches, the user interface 115 is incorporated into a vehicle infotainment system. The user interface 115 may be programmed to receive a first user input requesting that the host vehicle 100 operate in the partially autonomous mode and present a tutorial in response to receiving the first user input. The user interface 115 may be further programmed to receive a second user input indicating that the driver completed the tutorial, and other user inputs, which may indicate that the driver is not ready to operate the host vehicle 100 in the partially autonomous mode. The user interface 115 may transmit the user inputs to, e.g., the processor 125.

The tutorial may include text, images, video, etc., instructing the driver how to control the host vehicle 100 in the partially autonomous mode. For example, the tutorial may instruct the driver how to align the host vehicle 100 prior to initiating a park assist feature where the host vehicle 100 controls the steering, acceleration, and braking during a parking maneuver. Another tutorial may explain to the driver that activating cruise control may still require the driver to steer and brake the host vehicle 100, even if the host vehicle 100 is otherwise equipped with an emergency brake assist feature active while operating in cruise control.

At various times during presentation of the tutorial or at the end of the tutorial, the user interface 115 may present various prompts that require the driver to provide the second user input. The second user input may, therefore, indicate that the driver is interacting with the tutorial. In some instances, the prompt may include a question on something presented during the tutorial, and the second user input may include the answer to the question. Alternatively, the prompt may ask the driver whether he or she understood the tutorial, in which case the second user input may indicate an affirmative response from the driver.

Other user inputs may indicate that the driver is not ready to operate the host vehicle 100 in the partially autonomous mode. For example, a negative response to a prompt asking the driver whether he or she understood the tutorial may indicate that the driver is not ready to operate the host vehicle 100 in the partially autonomous mode. A user input identifying the wrong answer to a question presented via the user interface 115 may also indicate that the driver is not ready to operate the host vehicle 100 in the partially autonomous mode.

The autonomous mode controller 120 is implemented via circuits, chips, or other electronic components that can control the host vehicle 100 in fully autonomous or partially autonomous modes of operation. For instance, the autonomous mode controller 120 may be programmed to receive signals from various sensors located on the host vehicle 100 and output control signals to various actuators that control, e.g., the steering, braking, and acceleration in accordance with the sensor signals received. The autonomous mode controller 120 may be programmed to control the host vehicle 100 to implement any one or more of the SAE Levels of autonomous operation.

The processor 125 is implemented via memory 135, circuits, chips, or other electronic components. The memory 135 may store processor-executable instructions and make such instructions available to the processor 125. The processor 125 may access and execute the instructions to carry out various operations such as receiving the first user input requesting that the host vehicle 100 operate in the partially autonomous mode, commanding the user interface 115 to present the tutorial associated with the partially autonomous mode, receiving the second user input indicating that the driver completed the tutorial, and activating the partially autonomous mode in response to receiving the second user input.

The processor 125 may receive the first user input, the second user input, and any other user inputs from, e.g., the user interface 115. In some instances, the processor 125 may be programmed to only permit the user interface 115 to receive the first user input, the second user input, and any other user input while the host vehicle 100 is stopped, especially if the host vehicle 100 is operating in a non-autonomous mode of operation at the time the driver wishes to provide the first user input to activate the partially autonomous mode of operation. Thus, if the driver wishes to activate a partially autonomous mode of operation, he or she must first stop the host vehicle 100 and complete the tutorial while the host vehicle 100 is stopped. Further, in some possible approaches, the processor 125 may require that the host vehicle 100 is in "park" before permitting the user interface 115 to accept the first user input or present the tutorial.

In response to receiving the first user input, and before commanding the user interface 115 to present the tutorial, the processor 125 may be programmed to temporarily disable the partially autonomous mode. Temporarily disabling the partially autonomous mode may include the processor 125 outputting an autonomous mode disable signal to the autonomous mode controller 120. The autonomous mode disable signal may prevent the autonomous mode controller 120 from allowing the host vehicle 100 to operate in one or more of the partially autonomous modes. In some possible implementations, the autonomous mode disable signal may not prevent the autonomous mode controller 120 from allowing the host vehicle 100 to operate in one or more of the fully autonomous modes of operation (e.g., SAE levels 4-5) or non-autonomous modes of operation (e.g., SAE levels 0-1). If the partially autonomous operations are prevented, the processor 125 may command, e.g., the user interface 115 to present a notification to the driver indicating that the partially autonomous operations have been temporarily disabled and, in some instances, further including an explanation (e.g., the driver must complete the tutorial prior to being permitted to operate the host vehicle 100 in a partially autonomous mode).

Commanding the user interface 115 to present the tutorial may include the processor 125 outputting a signal to the user interface 115 with a selection of the tutorial to present to the driver. The tutorial may be selected among a number of tutorials stored locally in the memory 135 of the host vehicle 100 or on the remote server 130 from where the tutorial may be streamed or downloaded. The processor 125 may be programmed to select the tutorial in accordance with the partially autonomous mode of operation indicated by the first user input. For instance, if the first user input requests a cruise control with emergency brake assist feature, the processor 125 may be programmed to select the tutorial associated with operating the host vehicle 100 using cruise control with the emergency brake assist feature.

Prior to commanding the user interface 115 to present the tutorial, and possibly before receiving the first user input, the processor 125 may identify the driver of the host vehicle 100. The driver may be identified in accordance with a driver identification signal output by an occupant identification system. In one possible approach, the occupant detection system may include a camera that captures an image of the driver and identifies the driver from the image. Another option may include the occupant detection system identifying the driver from a key the driver used to access and start the host vehicle 100. Regardless of how the driver is identified, the occupant detection system may output the driver identification signal, representing the identity of the driver, to the processor 125. In some instances, the driver identification signal may include unique identification associated with the driver. The unique identification may be a unique alphanumeric code assigned to the driver that may be used to query the database stored on the remote server 130 to determine, e.g., the driver's experience level, whether the driver has already completed the tutorial, etc.

After identifying the driver, the processor 125 may be programmed to determine whether to command the user interface 115 to present the tutorial. If the driver is experienced with the partially autonomous mode of operation, or if the driver has already completed the tutorial, the processor 125 may determine that the driver does not need to complete the tutorial.

The processor 125 may be programmed to activate the partially autonomous mode after the driver completes the tutorial (e.g., after the driver provides the second user input) or after the processor 125 determines that the driver is experienced enough with the partially autonomous mode of operation to proceed without completing the tutorial. Activating the partially autonomous mode of operation may include the processor 125 outputting an autonomous activation signal to the autonomous mode controller 120 that instructs the autonomous mode controller 120 to permit the host vehicle 100 to operate in the partially autonomous mode of operation. The signal may in some possible approaches clear a flag set by the autonomous deactivation signal that previously disabled the partially autonomous mode of operation.

Figure 3:
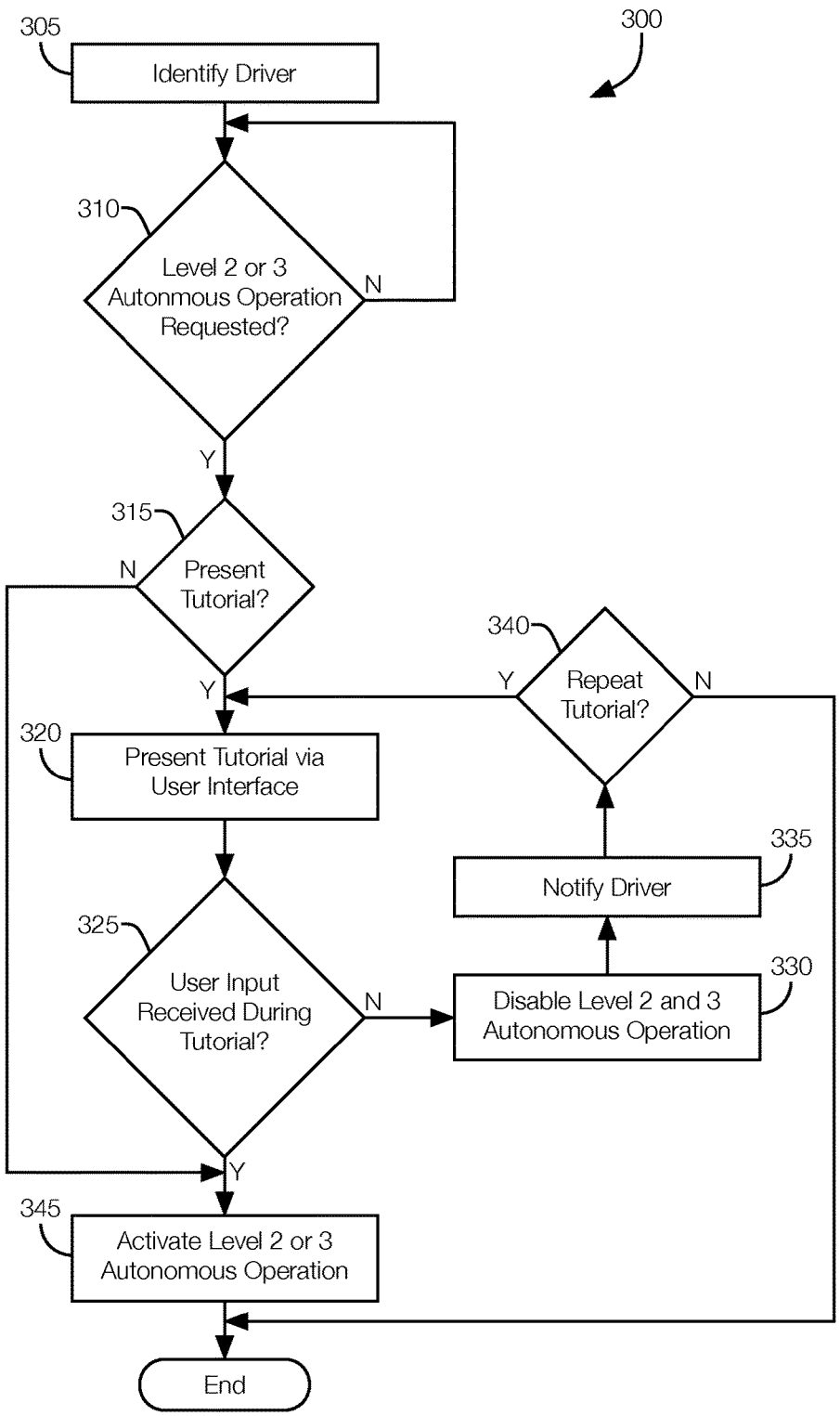
FIG. 3 is a flowchart of an example process that may be executed by the autonomous operation system to determine whether to present information about certain partially autonomous operations to a particular driver.

FIG. 3 is a flowchart of an example process 300 that may be executed by the autonomous operation system 105 to, e.g., present a tutorial to the certain drivers requesting that the host vehicle 100 operate in a partially autonomous mode. The process 300 may begin at any time while the host vehicle 100 is running. The process 300 may run once or multiple times within a single key cycle.

At block 305, the autonomous operation system 105 identifies the driver. Specifically, the processor 125 may identify the driver according to the driver identification signal, representing a unique identification associated with the driver, output by the occupant detection system. Alternatively, the driver may be identified in response to a user input, e.g., selecting the driver, or a unique identification associated with the driver, provided to the user interface 115. In yet another alternative, the driver may be identified according to a key used by the driver to unlock or start the host vehicle 100. The process 300 may proceed to block 310 after the driver has been identified. In some instances, the driver may be identified after block 310, meaning that the driver is identified in response to the autonomous operation system 105 receiving a user input requesting the partially autonomous mode of operation.

At decision block 310, the autonomous operation system 105 determines whether the driver has requested a partially autonomous mode of operation. As discussed above, partially autonomous modes of operation may refer to SAE Level 2 or SAE Level 3 modes of operation. The processor 125 may determine that the driver has requested the partially autonomous mode of operation in response to the driver providing the user input, requesting the partially autonomous mode of operation, to the user interface 115, and the user interface 115 transmitting the first user input to the processor 125. That is, the processor 125 may determine that the driver has requested the partially autonomous mode in response to receiving the first user input. If the partially autonomous mode of operation is requested, the process 300 may proceed to block 315. Otherwise, the process 300 may continue to execute block 310 until the partially autonomous mode of operation is requested (i.e., the first user input requesting the partially autonomous mode of operation is received).

At decision block 315, the autonomous operation system 105 determines whether to present the tutorial. For instance, the processor 125 may determine whether to command the user interface 115 to present the tutorial based on, e.g., the experience level of the driver, whether the driver has already completed the tutorial, etc. To determine the driver's experience level of whether the driver has already completed the tutorial, the processor 125 may query a local (on-board) database or a remote database stored on the remote server 130. Querying the database on the remote server 130 may include the processor 125 commanding the communication interface 110 to transmit the unique identification associated with the identified driver to the remote server 130 and receiving, via the communication interface 110, data representing the driver's experience level or data indicating whether the driver has previously completed the tutorial. Thus, the processor 125 may process the data received from the remote server 130 to determine whether to present the tutorial. If the tutorial is to be presented, the process 300 may proceed to block 320. If the tutorial is not to be presented, the process 300 may proceed to block 345.

At block 320, the autonomous operation system 105 presents the tutorial. Presenting the tutorial may include the processor 125 selecting among multiple tutorials for the tutorial associated with the partially autonomous mode of operation requested at block 310. The processor 125 may command the user interface 115 to present the selected tutorial. In some instances, prior to commanding the user interface 115 to present the tutorial, block 320 may further include the processor 125 temporarily disabling the partially autonomous mode. For instance, the processor 125 may output an autonomous mode disable signal to the autonomous mode controller 120 to temporarily disable the partially autonomous mode of operation. The autonomous mode disable signal may prevent the autonomous mode controller 120 from allowing the host vehicle 100 to operate in one or more of the partially autonomous modes, including the partially autonomous mode associated with the request received at block 310. In some possible implementations, the autonomous mode disable signal may not prevent the autonomous mode controller 120 from allowing the host vehicle 100 to operate in one or more of the fully autonomous modes of operation (e.g., SAE levels 4-5) or non-autonomous modes of operation (e.g., SAE levels 0-1).

At decision block 325, the autonomous operation system 105 determines whether the driver adequately interacted with the tutorial. For example, at various times during presentation of the tutorial or at the end of the tutorial, the user interface 115 may present various prompts that require the driver to provide the second user input. The second user input may, therefore, indicate that the driver is interacting with the tutorial. In some instances, the prompt may include a question on something presented during the tutorial, and the second user input may include the answer to the question. Alternatively, the prompt may ask the driver whether he or she understood the tutorial, in which case the second user input may indicate an affirmative response from the driver. Thus, the second user input may indicate that the driver has completed the tutorial, and the processor 125 may determine whether the second user input was received. If so, the process 300 may proceed to block 345. If the second user input is not received during the tutorial or within a predetermined amount of time after the tutorial is completed, the process 300 may proceed to block 330.

At block 330, the autonomous operation system 105 disables the partially autonomous mode of operation. For instance, the processor 125 may output the autonomous mode disable signal to the autonomous mode controller 120 to disable the partially autonomous mode of operation. The autonomous mode disable signal may prevent the autonomous mode controller 120 from allowing the host vehicle 100 to operate in one or more of the partially autonomous modes. In some possible implementations, the autonomous mode disable signal may not prevent the autonomous mode controller 120 from allowing the host vehicle 100 to operate in one or more of the fully autonomous modes of operation (e.g., SAE levels 4-5) or non-autonomous modes of operation (e.g., SAE levels 0-1). This block may be skipped if the partially autonomous mode of operation was temporarily disabled at block 320 and remains disabled after block 325.

At block 335, the autonomous operation system 105 notifies the driver that the partially autonomous mode of operation has been disabled. For instance, the processor 125 may command, e.g., the user interface 115 to present a notification to the driver indicating that the partially autonomous operations were prevented and, in some instances, may further include an explanation (e.g., the driver must complete the tutorial before he or she can operate the host vehicle 100 in a partially autonomous mode).

At decision block 340, the autonomous operation system 105 determines whether to repeat the tutorial. For instance, the processor 125 may allow the driver to attempt to complete the tutorial again either immediately or after some predetermined period of time has elapsed. If the processor 125 decides to give the driver another opportunity to complete the tutorial, the process 300 may proceed to block 320. Otherwise, the process 300 may end.

At block 345, the autonomous operation system 105 activates the partially autonomous mode of operation. Activating the partially autonomous modes may include the processor 125 outputting an autonomous activation signal to the autonomous mode controller 120 that instructs the autonomous mode controller 120 to begin the partially autonomous mode of operation associated with the request received at block 310. The autonomous activation signal may, in some possible approaches, clear a flag set by the autonomous deactivation signal that previously disabled the partially autonomous mode of operation during, e.g., a previous iteration of the process 300. The process 300 may end after block 345.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
    a user interface;
    an autonomous mode controller programmed to control a host vehicle in a partially autonomous mode; and
    a processor programmed to receive a first user input requesting the partially autonomous mode, command the user interface to present a tutorial associated with the partially autonomous mode, receive a second user input indicating that a driver completed the tutorial, and activate the partially autonomous mode in response to receiving the second user input,
    wherein the processor is programmed to temporarily disable the partially autonomous mode after receiving the first user input and before commanding the user interface to present the tutorial.

2. The vehicle system of claim 1, wherein activating the partially autonomous mode includes outputting an autonomous activation signal to the autonomous mode controller.

3. The vehicle system of claim 1, wherein the processor is programmed to identify the driver of the host vehicle.

4. The vehicle system of claim 3, wherein the processor is programmed to determine whether to command the user interface to present the tutorial to the driver after identifying the driver.

5. The vehicle system of claim 4, wherein the processor is programmed to determine whether to command the user interface to present the tutorial based at least in part on whether the driver has previously completed the tutorial.

6. The vehicle system of claim 5, wherein the processor is programmed to query a remote server to determine whether the driver has previously completed the tutorial.

7. The vehicle system of claim 1, wherein the processor is programmed to receive the first user input and the second user input via the user interface.

8. A method comprising:
    receiving, at a processor, a first user input requesting that a host vehicle operates in a partially autonomous mode;
    temporarily disabling, by the processor, the partially autonomous mode after receiving the first user input and before commanding a user interface to present a tutorial associated with the partially autonomous mode;
    commanding, by the processor, the user interface to present the tutorial;
    receiving, at the processor, a second user input indicating that a driver completed the tutorial; and
    activating, by the processor, the partially autonomous mode in response to receiving the second user input.

9. The method of claim 8, wherein activating the partially autonomous mode includes outputting an autonomous activation signal to an autonomous mode controller.

10. The method of claim 8, further comprising identifying the driver of the host vehicle.

11. The method of claim 10, further comprising determining whether to command the user interface to present the tutorial to the driver after identifying the driver.

12. The method of claim 11, wherein determining whether to command the user interface to present the tutorial includes determining whether the driver has previously completed the tutorial.

13. The method of claim 12, wherein determining whether the driver has previously completed the tutorial includes querying a remote server and determining whether the driver has previously completed the tutorial based at least in part on a response received from the remote server.

14. The method of claim 8, wherein the first user input and the second user input are received via a user interface located in the host vehicle.

15. A vehicle system comprising:
a user interface;
an autonomous mode controller programmed to control a host vehicle in a partially autonomous mode; and
a processor programmed to receive a first user input requesting the partially autonomous mode, temporarily disable the partially autonomous mode in response to receiving the first user input; command the user interface to present a tutorial associated with the partially autonomous mode, receive a second user input indicating that a driver completed the tutorial, and activate the partially autonomous mode in response to receiving the second user input by outputting an autonomous activation signal to the autonomous mode controller.

16. The vehicle system of claim 15, wherein the processor is programmed to identify the driver of the host vehicle.

17. The vehicle system of claim 16, wherein the processor is programmed to determine whether to command the user interface to present the tutorial to the driver after identifying the driver.

18. The vehicle system of claim 17, wherein the processor is programmed to determine whether to command the user interface to present the tutorial based at least in part on whether the driver has previously completed the tutorial.

* * * * *